United States Patent
Paek et al.

(10) Patent No.: US 8,800,037 B2
(45) Date of Patent: Aug. 5, 2014

(54) SYSTEM FOR AN ENGINE FOR FORECASTING CYBER THREATS AND METHOD FOR FORECASTING CYBER THREATS USING THE SYSTEM

(75) Inventors: Seung Hyun Paek, Daejeon (KR); In Sung Park, Daejeon (KR); Eun Young Lee, Daejeon (KR); Joo Beom Yun, Daejeon (KR); Ki Wook Sohn, Daejeon (KR); Seok Jin Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 13/320,263

(22) PCT Filed: Jun. 22, 2010

(86) PCT No.: PCT/KR2010/004026
§ 371 (c)(1),
(2), (4) Date: Nov. 12, 2011

(87) PCT Pub. No.: WO2011/004977
PCT Pub. Date: Jan. 13, 2011

(65) Prior Publication Data
US 2012/0096552 A1    Apr. 19, 2012

(30) Foreign Application Priority Data

Jul. 7, 2009  (KR) .................... 10-2009-0061602

(51) Int. Cl.
*G06F 11/00*   (2006.01)
*H04L 29/06*   (2006.01)
*G06F 21/55*   (2013.01)
*G06F 21/57*   (2013.01)

(52) U.S. Cl.
CPC .......... *G06F 21/577* (2013.01); *H04L 63/1416* (2013.01); *G06F 21/552* (2013.01)
USPC ................ 726/23; 726/22; 713/189; 713/194

(58) Field of Classification Search
None
See application file for complete search history.

(56) References Cited

U.S. PATENT DOCUMENTS 5,987,442 A    11/1999  Lewis et al.
6,076,174 A *  6/2000   Freund .................... 714/47.3
(Continued)

FOREIGN PATENT DOCUMENTS

JP    2005-341217 A    12/2005
(Continued)

OTHER PUBLICATIONS

Adi Levin, "User-Interface Threads in MFC", Jun. 29, 2009, pp. 1-3, XP055047544.

(Continued)

*Primary Examiner* — Philip Chea
*Assistant Examiner* — Khoi Le
(74) *Attorney, Agent, or Firm* — LRK Patent Law Firm (57) ABSTRACT

A system for an engine for forecasting cyber threats and a method enabling the forecast of a low-level cyber threat and the forecast of a high-level cyber threat using the low-level cyber threat in a hierarchical structure of cyber threats are provided. The system includes a forecast information database which stores forecast information including cyber threat forecast items, a forecast schedule related to the items, forecast simulation information, forecast item hierarchical structure information, time series data on cyber threats, and sample data on cyber threats; a forecast engine core subsystem which forecasts the levels of threats for the cyber threat forecast items having a hierarchical structure using the forecast information stored in the forecast information database; and a forecast engine control interface which receives control commands for the forecast engine core subsystem from a user or external system, and delivers the received control commands to the forecast engine core subsystem.

17 Claims, 9 Drawing Sheets

(56) References Cited

U.S. PATENT DOCUMENTS

| | | | |
|---|---|---|---|
| 6,996,843 B1* | 2/2006 | Moran | 726/23 |
| 7,093,132 B2* | 8/2006 | Aho et al. | 713/176 |
| 7,136,860 B2 | 11/2006 | Doliov | |
| 7,568,232 B2* | 7/2009 | Mitomo et al. | 726/25 |
| 7,603,709 B2* | 10/2009 | Lewis et al. | 726/23 |
| 7,657,938 B2* | 2/2010 | Palmer et al. | 726/23 |
| 2006/0191010 A1* | 8/2006 | Benjamin | 726/23 |
| 2008/0115221 A1* | 5/2008 | Yun et al. | 726/25 |
| 2009/0126023 A1* | 5/2009 | Yun et al. | 726/25 |
| 2009/0235355 A1* | 9/2009 | Chen et al. | 726/23 |
| 2012/0109610 A1* | 5/2012 | Anderson et al. | 703/8 |
| 2012/0210429 A1* | 8/2012 | Stute | 726/23 |
| 2012/0260342 A1* | 10/2012 | Dube et al. | 726/24 |

FOREIGN PATENT DOCUMENTS

| | | |
|---|---|---|
| JP | 2008-287435 A | 11/2008 |
| JP | 2009-145956 A | 7/2009 |
| KR | 10-0625096 B1 | 9/2006 |
| KR | 10-2008-0047261 A | 5/2008 |
| KR | 10-2009-0001609 A | 1/2009 |
| KR | 10-2009-0048955 A | 5/2009 |
| WO | 2004/038594 A1 | 5/2004 |

OTHER PUBLICATIONS

Chie Ishida et al., "Forecast of Increasing or Decreasing Intrusion Event Counts Using Bayesian Inference", vol. 46, No. 11, pp. 2704-2713, Nov. 15, 2005.

Yasuhiko Nagai et al., "An Optimal Decision Method for Establishment of Security Objectives", vol. 41, No. 8, pp. 2264-2271, Aug. 15, 2000.

* cited by examiner

| Cyber threat forecast item | | | |
|---|---|---|---|
| Identifier | Item name | Forecast schedule | Forecast model |
| 1 | Overall degree of cyber threat | 2 am everyday | Weighted-sum model, (0.2, 0.2, 0.2, 0.2, 0.2) |
| 2 | Degree of hacking threat | 1 am everyday | Weighted-sum model, (0.6, 0.4) |
| 3 | Degree of malicious code threat | 1 am everyday | Weighted-sum model, (0.2, 0.8) |
| 4 | Degree of vulnerability threat | 1 am everyday | Weighted-sum model, (0.3, 0.7) |
| 5 | Degree of cyber demonstration threat | 1 am everyday | Weighted-sum model, (0.5, 0.5) |
| 6 | Opinion-based forecast | 1 am everyday | Representative value calculation model, mean |
| 8 | Frequency of intrusion detection events | 3 am everyday | Time-series forecast model, HoltWinter |
| 9 | Frequency of hacking | 3 am everyday | Time-series forecast model, ARIMA |
| 10 | Frequency of new malicious code announcements | 3 am everyday | Time-series forecast model, GARCH |
| 11 | Frequency of malicious code detection | 3 am everyday | Time-series forecast model, ARIMA |
| 12 | Frequency of new vulnerability announcements | 3 am everyday | Time-series forecast model, AR-ARCH |
| 13 | Frequency of network vulnerability detection | 3 am everyday | Time-series forecast model, ARIMA |
| 14 | Frequency of posts on main web board | 3 am everyday | Time-series forecast model, ARMA |
| 15 | Degree of importance of main event schedule | 3 am everyday | Representative value calculation model, sum |

FIG 4

| Cyber threat forecast item hierarchical structure | |
|---|---|
| Item identifier | Lower-level item identifier |
| 1 | 2 |
| 1 | 3 |
| 1 | 4 |
| 1 | 5 |
| ... | ... |

FIG 5

| Cyber threat sample data | | | |
|---|---|---|---|
| Item identifier | Date | Serial number | Sample value |
| 6 | 2008-06-20 | 1 | 20 |
| 6 | 2008-06-20 | 2 | 30 |
| 6 | 2008-06-20 | 3 | 40 |
| 15 | 2008-06-20 | 1 | 50 |
| ... | ... | ... | ... |

FIG 6

| Cyber threat time-series data | | |
|---|---|---|
| Item identifier | Date | Measured value |
| 8 | 2008-06-20 | 25 |
| 8 | 2008-06-21 | 55 |
| 8 | 2008-06-22 | 82 |
| 9 | 2008-06-20 | 31 |
| ... | ... | ... |

FIG 7

| Cyber threat forecast result | | | | | | | | |
|---|---|---|---|---|---|---|---|---|
| Item identifier | Date | Measured value | Forecasted value | Error | Accuracy | Highest value | Lowest value | Increase and decrease ratio |
| 8 | 2008-06-20 | 25 | 26 | 1 | 90% | 31 | 20 | 30% |
| 8 | 2008-06-21 | 55 | 50 | -5 | 85% | 59 | 50 | 100% |
| 8 | 2008-06-22 | 82 | 80 | -2 | 93% | 86 | 74 | 60% |
| 8 | 2008-06-23 | | 90 | | | 95 | 75 | 10% |
| 9 | 2008-06-20 | 31 | 31 | 0 | 100% | 35 | 25 | 5% |
| ... | ... | ... | ... | ... | ... | ... | ... | ... |

SYSTEM FOR AN ENGINE FOR FORECASTING CYBER THREATS AND METHOD FOR FORECASTING CYBER THREATS USING THE SYSTEM

CROSS REFERENCE TO RELATED APPLICATION

This application is a National Stage of International Application No. PCT/KR2010/004026 filed Jun. 22, 2010, claiming priority based on Korean Patent Application No. 10-2009-0061602 filed Jul. 7, 2009, the content of which is incorporated herein by reference in its entirety.

TECHNICAL FIELD

The present invention relates to a cyber threat forecast engine system and method of forecasting a cyber threat in the cyber threat forecast engine system, and more particularly, to a cyber threat forecast engine system and method that forecast lower-level cyber threats in a cyber threat hierarchical structure and an upper-level cyber threat using the forecast result on the lower-level cyber threats.

BACKGROUND ART

With the rapid growth of information and communication technology such as the Internet, cyber threats from computer hacking, viruses, worms, Trojan horses, etc., are growing. With regard to such cyber threats, there are an intrusion detection system (IDS), an intrusion prevention system (IPS), a control system, an enterprise security management (ESM) system, and so on. The systems can detect a current attack or provide information about a current network state.

However, such information is provided upon a cyber attack, and thus it is difficult for an administrator or user to prevent or prepare for the attack. Also, the information about cyber threats only tells a fragmentary situation, such as a special weather report, and does not include quantified forecast information representing the trends of cyber threat categories, such as hacking and worm viruses, or the overall trend of all cyber threats that a department actually establishing a security policy and budget wants to know.

Thus, when forecast information about cyber threat categories, such as hacking, malicious code and illegal access attempts, is provided in advance to a security staff or persons establishing the security policy and budget of an organization, it may help to establish a countermeasure against cyber attacks of a category that is highly likely to occur in the future and cope with the cyber attacks.

To provide forecast information about cyber threat categories, lower-level cyber threats such as the frequency of intrusion and the frequency of worms and viruses must be forecasted, and also upper-level cyber threats such as the degrees of threat from hacking and malicious code must be forecasted using the forecast result. However, although there is technology for network intrusion detection and prevention, network monitoring, enterprise security management, early cyber threat warning, etc., there is none for forecasting cyber threats having a hierarchical structure yet.

DISCLOSURE

Technical Problem

The present invention is directed to providing a cyber threat forecast engine system and method that forecast lower-level cyber threats in a cyber threat hierarchical structure and can forecast an upper-level cyber threat using the forecast result.

The present invention is also directed to providing a cyber threat forecast engine system and method that calculate forecast values of the degrees of lower-level cyber threats corresponding to a forecast-objective time point using a time-series forecast model on lower-level cyber threats, such as the frequency of intrusion and the frequency of worms and viruses, and a representative value calculation model on a variety of sample data, such as opinion about cyber threats, and calculate a forecast value of an upper-level cyber threat by giving threat-specific weights to the forecast values of the lower-level cyber threats and summing the weighted values, and thus can be used in an existing security service having no forecasting technique or a new application and service (e.g., a service for automatically calculating an estimated damage) based on the forecast value of a cyber threat.

Technical Solution

One aspect of the present invention provides a cyber threat forecast engine system, including: a forecast information database (DB) for storing forecast information including a plurality of cyber threat forecast items with a hierarchical structure, a forecast schedule and forecast model information related to each of the cyber threat forecast items, hierarchical structure information between the cyber threat forecast items, cyber threat time-series data, and cyber threat sample data; a forecast engine core sub-system for forecasting degrees of threat for the cyber threat forecast items with a hierarchical structure using the forecast information stored in the forecast information DB; and a forecast engine control interface for receiving a control instruction for the forecast engine core sub-system from a user or external system and transferring the control instruction to the forecast engine core sub-system.

The forecast engine core sub-system may include: a forecast schedule management module for reading the forecast schedule from the forecast information DB, storing it in a memory, and managing a standby schedule waiting to perform a forecast and an execution schedule currently performing a forecast; a forecast item hierarchical structure management module for reading the forecast item hierarchical structure information from the forecast information DB, constructing an entire forecast item hierarchical structure, and storing it in a memory; a hierarchical forecaster management module for configuring and managing forecasters respectively corresponding to the forecast items according to the entire forecast item hierarchical structure; and a forecast schedule execution module for reading the execution schedule managed by the forecast schedule management module and transferring a forecast item and forecast model information related to the execution schedule to the forecaster management module to instruct the forecaster management module to perform a forecast. Here, the forecaster management module may search for a forecaster corresponding to the forecast item received from the forecast schedule execution module and operate it, and the forecaster may perform a forecast according to the forecast model information corresponding to the forecast item.

Another aspect of the present invention provides a method of forecasting a cyber threat in a cyber threat forecast engine system having a forecast information DB storing forecast information including a plurality of cyber threat forecast items, a forecast schedule and forecast model information related to the cyber threat forecast items, forecast item hierarchical structure information, cyber threat time-series data, and cyber threat sample data, the method comprising: reading the cyber threat forecast items, the forecast schedule, the forecast model information, and the forecast item hierarchical structure information from the forecast information DB, storing them in a memory, and configuring forecasters based on the forecast item hierarchical structure information to initialize the system; periodically checking the forecast schedule stored in the memory and determining whether or not it is a forecast-execution time point; when it is the forecast-execution time point according to the forecast schedule, searching for a forecaster corresponding to a forecast item related to the forecast schedule, providing forecast model information related to the forecast item to the searched forecaster, and operating the forecaster; reading, at the forecaster, at least one of the forecast information needed to perform a forecast from the forecast information DB, and performing a forecast based on the provided forecast model information; and storing a forecast result including a forecast value calculated by the forecaster in the forecast information DB.

Advantageous Effects

A cyber threat forecast engine system and method according to an exemplary embodiment of the present invention forecast the degree of a top-level cyber threat, such as the overall degree of cyber threats, based on the hierarchical structure of various cyber threats and provide the result to an existing security system, such as an enterprise security management (ESM) system, thereby enabling prevention of cyber threats that may occur in the future. By interoperating an existing control system with the forecast engine system according to an exemplary embodiment of the present invention, a user can give an alarm based on forecast information about the overall degree of cyber threats, or prepare electronic resources to be protected from cyber attacks, such as update of a security patch, renewal of an intrusion detection rule, and checking and strengthening of a vulnerability, based on the result of forecasting the degrees of threat according to cyber threat categories, such as the degree of threat from hacking, and the degree of threat from worms and viruses.

MODE FOR INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
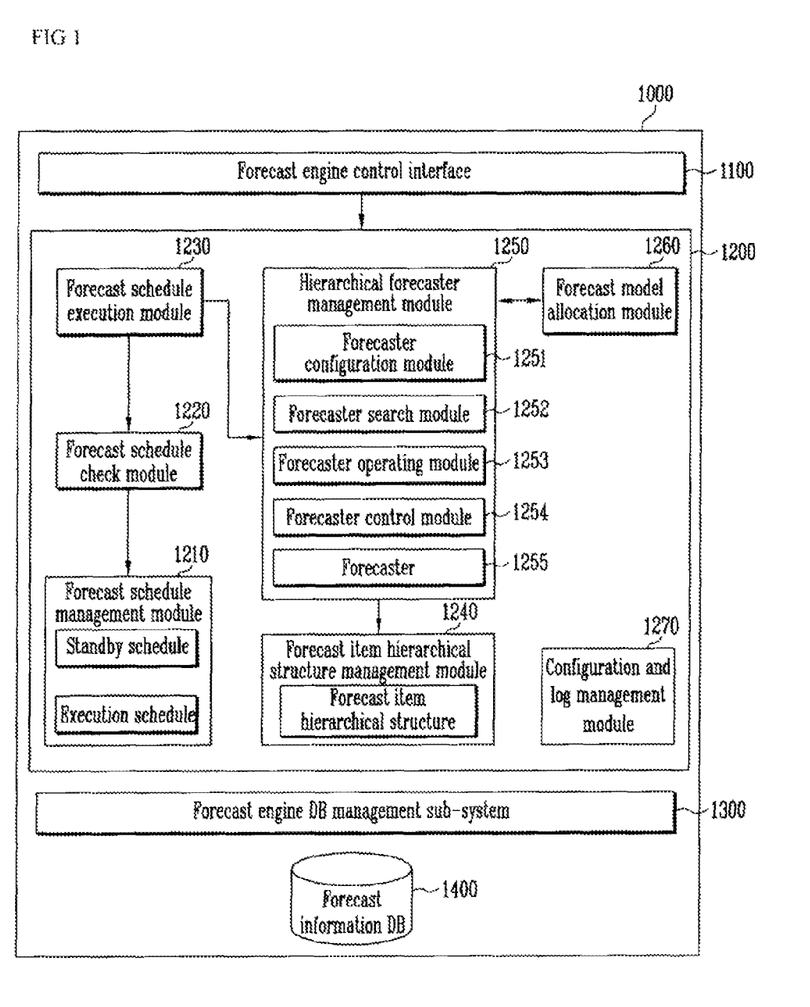
FIG. 1 is a block diagram of a cyber threat forecast engine system according to an exemplary embodiment of the present invention.

FIG. 1 is a block diagram of a cyber threat forecast engine system according to an exemplary embodiment of the present invention.

Referring to FIG. 1, a cyber threat forecast engine system 1000 includes: a forecast engine control interface 1100 providing an interface for a user or external system; a forecast engine core sub-system 1200 forecasting hierarchical cyber threats according to forecast information stored in a forecast information database (DB) 1400; a forecast engine DB management sub-system 1300 requesting the forecast information from the forecast information DB 1400, transferring it to the forecast engine sub-system 1200, and recording a forecast result of the forecast engine core sub-system 1200 in the forecast information DB 1400; and the forecast information DB 1400 storing the forecast information.

The forecast engine control interface 1100 receives a control instruction from a user or an external system that utilizes the cyber threat forecast engine system 1000 according to an exemplary embodiment of the present invention, and forwards it to the forecast engine core sub-system 1200. The control instruction may include start, stop, pause and resume of the forecast engine core sub-system 1200 and also an instruction for synchronizing forecast information including a forecast schedule, a forecast item, and a forecast item hierarchical structure between the forecast information DB 1400 and a memory.

The forecast information DB 1400 stores forecast information required for the forecast engine core sub-system 1200 to forecast cyber-threats. The forecast information may include at least one of forecast item information having cyber threat forecast item names, the forecast schedule of the items, and forecast model information for the items, forecast item hierarchical structure information, cyber threat time series data, cyber threat sample data, and forecast results. The structure of the forecast information DB 1400 will be described later with reference to FIGS. 2 to 7.

The forecast engine DB management sub-system 1300 searches for forecast information in the forecast information DB 1400 in response to a forecast information request from the forecast engine core sub-system 1200, transfers the forecast information to the forecast engine core sub-system 1200, and stores forecast results from the forecast engine core sub-system 1200 in the forecast information DB 1400.

The forecast engine core sub-system 1200 includes a forecast schedule management module 1210, a forecast schedule check module 1220, a forecast schedule execution module 1230, a forecast item hierarchical structure management module 1240, a hierarchical forecaster management module 1250, a forecast model allocation module 1260, and a configuration and log management module 1270.

The forecast schedule management module 1210 reads a forecast schedule from the forecast information DB 1400 and stores it in a memory, and manages a standby schedule for to-be-forecasted items and an execution schedule for currently-forecasted items. The forecast schedule management module 1210 performs synchronization of forecast schedule information between the forecast information DB 1400 and the memory, and manages a standby schedule list using a double-linked list data structure and an execution schedule queue using a queue data structure. In an exemplary embodiment, the forecast schedule management module 1210 is executed in a different thread from the forecast schedule check module 1220 and the forecast schedule execution module 1230. The forecast schedule management module 1210, the forecast schedule check module 1220 and the forecast schedule execution module 1230 share the forecast schedule information and provide simultaneity using a mutual exclusive (Mutex) technique.

The forecast schedule check module 1220 periodically checks the standby schedule list, and when it is a forecast time point, converts a standby schedule into an execution schedule by removing the schedule from the standby schedule list and inserting the removed schedule into the execution schedule queue.

The forecast schedule execution module 1230 reads the schedule information of the execution schedule queue managed by the forecast schedule management module 1210 and transfers a forecast item and forecast model information set in the schedule information to the forecaster management module 1250.

The forecast item hierarchical structure management module 1240 reads forecast item information and forecast item hierarchical structure information from the forecast information DB 1400 and maintains and manages it in a memory. Specifically, the forecast item hierarchical structure management module 1240 performs forecast item synchronization between the forecast information DB 1400 and the memory, reads forecast items and forecast item hierarchical structure information, constructs an entire forecast item hierarchical structure based on the read information, and stores it in the memory. In an exemplary embodiment, the entire forecast item hierarchical structure may be a tree structure.

The hierarchical forecaster management module 1250 configures and manages forecasters 1255 corresponding to respective forecast items one to one according to the entire forecast item hierarchical structure managed by the forecast item hierarchical structure management module 1240. In an exemplary embodiment, the hierarchical forecaster management module 1250 includes a forecaster configuration module 1251, a forecaster search module 1252, a forecaster operating module 1253, a forecaster control module 1254, and the forecasters 1255. The forecaster configuration module 1251 configures the forecasters 1255 corresponding to respective forecast items of the entire forecast item hierarchical structure managed by the forecast item hierarchical structure management module 1240 one to one. The forecaster search module 1252 searches for a forecaster 1255 corresponding to a forecast item received from the forecast schedule execution module 1230. The forecaster operating module 1253 generates a separate thread, operates the searched forecaster 1255 in the thread, and provides forecast model information related to the forecast item to the forecaster 1255. The forecaster control module 1254 controls the forecasters 1255 that are operating in different threads according to a control instruction transferred through the forecast engine control interface 1100 and including stop, pause and resume.

Using forecast model information about the corresponding cyber threat forecast items, the forecasters 1255 are allocated forecast model objects from the forecast model allocation module 1260, forecasts the degree of threat, and instructs the forecast engine DB management sub-system 1300 to store the forecast result in the forecast information DB 1400.

The forecast model allocation module 1260 receives forecast model information from the forecasters 1255 and allocates forecast model objects related to the forecast model information to the forecasters 1255. In an exemplary embodiment, the forecast model allocation module 1260 allocates a time-series forecast model object (e.g., an autoregressive integrated moving average (ARIMA) model, Holt-Winter's model, etc.) or a representative value (e.g. a median, a mode, or a mean) calculation model object, in order to forecast cyber threat items in the lowermost level of the hierarchical structure. It also allocates a weighted-sum model object that normalizes forecast results on lower-level items, gives weights to the normalized results, and sums the weighted results, in order to forecast a cyber threat item in an upper level.

The configuration and log management module 1270 manages configuration information and execution log information required for the cyber threat forecast engine system 1000. For example, the configuration information may include information about whether a forecaster is executed in multiple threads or a single thread, the maximum number of the multiple threads, the degree of detail of an execution log, a forecast schedule check cycle, and DB access information. It is stored in a configuration file. When forecaster is set for multi-thread execution, several forecasters may simultaneously operate in multiple threads, but when the forecaster is set for single-thread execution, it operates in the same single thread with the forecast schedule execution module 1230.

The execution log information includes information about errors and debugs occurring while a forecast engine is operating, forecast engine self-check information, etc. It is stored in an execution log file.

The cyber threat forecast engine system 1000 according to an exemplary embodiment of the present invention has a software framework structure that performs forecast item synchronization with the forecast information DB 1400 using the forecast item hierarchical structure management module 1240, reconfigures the forecasters 1255 using the hierarchical forecaster management module 1250, and synchronizes a forecast schedule using the forecast schedule management module 1210, and thus can dynamically perform addition and removal of a forecast item, change of a hierarchical structure, addition, removal and change of a forecast schedule, and setting and change of a forecast-objective-specific forecast model without modifying or re-booting the entire system.

Figure 2:
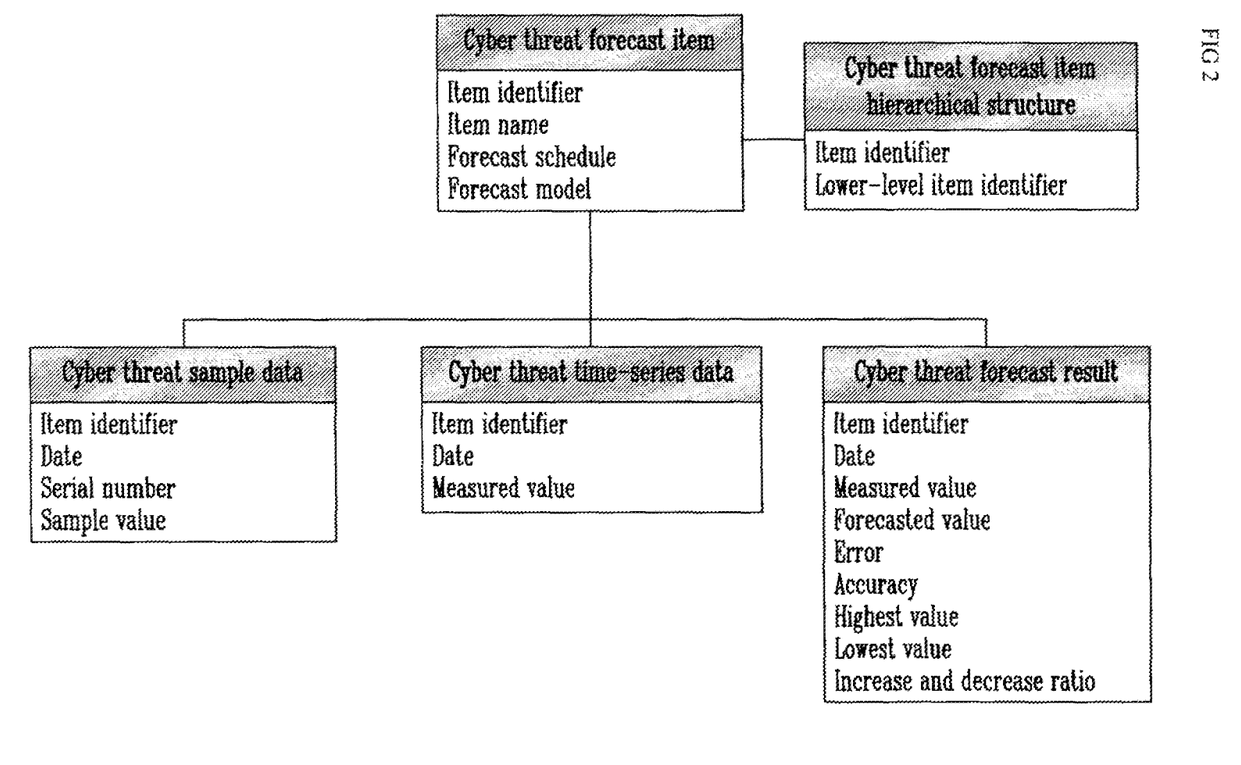
FIGS. 2 to 7 conceptually illustrate the structure of a forecast information database (DB) according to an exemplary embodiment of the present invention.

FIGS. 2 to 7 conceptually illustrate the structure of a forecast information DB according to an exemplary embodiment of the present invention. Specifically, FIG. 2 illustrates the entire structure of the forecast information DB, and FIGS. 3 to 7 illustrate the detailed structures of respective items stored in the forecast information DB.

As shown in FIG. 2, the forecast information DB includes information about cyber threat forecast items, cyber threat forecast item hierarchical structure information, cyber threat sample data, cyber threat time-series data, and a cyber threat forecast result. The respective items will be described below.

Figure 3:
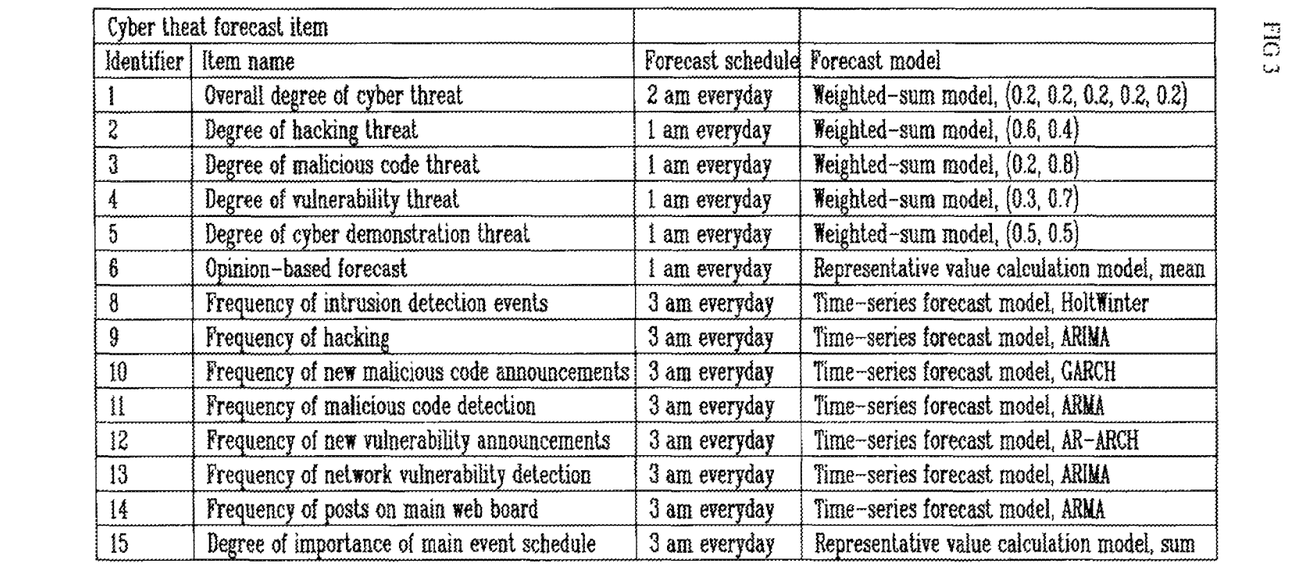

FIG. 3 illustrates a detailed structure of cyber threat forecast item information. As shown in the drawing, the cyber threat forecast item information includes forecast item identifiers, item names, forecast schedules, and forecast model information. The forecast items include, for example, the overall degree of cyber threats, the degree of hacking threat, the degree of malicious code threat, the degree of vulnerability threat, the degree of cyber demonstration threat, opinion-based forecast, the frequency of intrusion detection events, the frequency of hacking, the frequency of new malicious code announcements, the frequency of malicious code detection, the frequency of network vulnerability detection, and so on. Forecast schedules and information about forecast models related to respective forecast items are stored. A forecast model may be, for example, the time-series forecast model, the representative value calculation model, or the weighted-sum model. In the case of the weighted-sum model, a predetermined weight is included.

Figure 4:
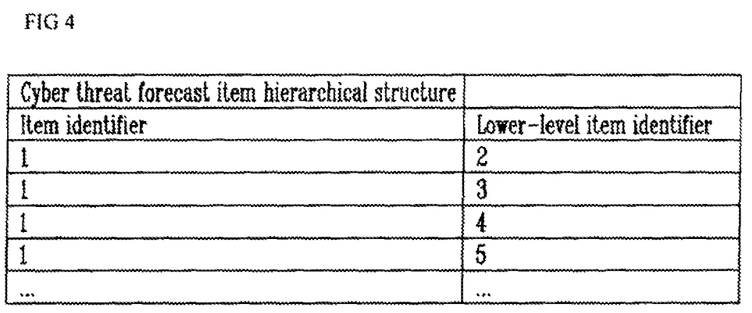

FIG. 4 illustrates a detailed structure of cyber threat forecast item structure information. The cyber threat forecast item structure information is needed to determine an operation sequence of forecasters corresponding to forecast items for hierarchical forecast of cyber threats. As shown in the drawing, the cyber threat forecast item structure information includes identifiers of lower-level items belonging to each item identifier. For example, an item "the overall degree of cyber threats" whose identifier is 1 includes lower-level items such as "the degree of hacking threat" (identifier 2), "the degree of malicious code threat" (identifier 3), "the degree of vulnerability threat" (identifier 4), and "the degree of cyber demonstration threat" (identifier 5).

Figure 5:
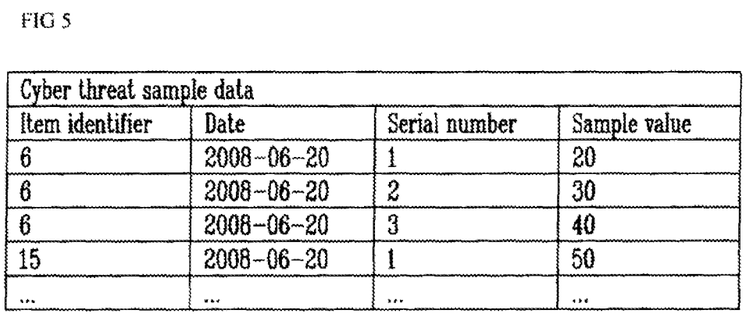

FIG. 5 illustrates a detailed structure of cyber threat sample data. The cyber threat sample data is needed to perform a forecast based on sample data such as an opinion-based cyber threat forecast or the degree of importance of a main event schedule. For example, the cyber threat sample data includes item identifiers, dates, serial numbers, and sample values.

Figure 6:
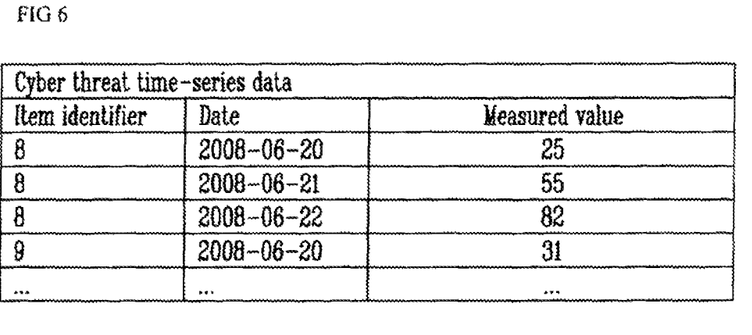

FIG. 6 illustrates a detailed structure of cyber threat time-series data. The cyber threat time-series data includes the number of events that have occurred in the past such as the frequency of intrusion detection events. For example, the cyber threat time-series data includes item identifiers, dates, and measured values.

Figure 7:
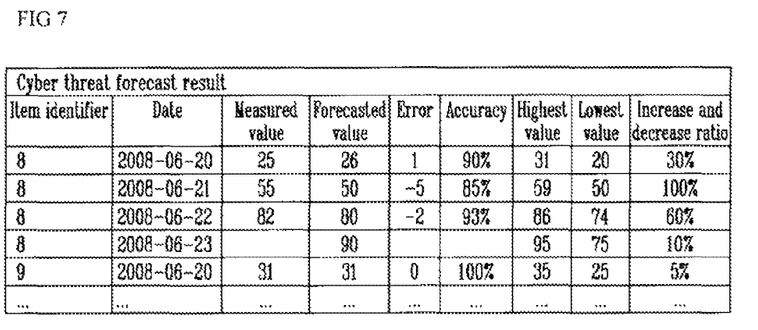

FIG. 7 illustrates a detailed structure of a cyber threat forecast result. The cyber threat forecast result is obtained by a cyber threat forecast engine system according to an exemplary embodiment of the present invention, and includes forecast dates, measured values, forecast values, errors, accuracies, the highest values, the lowest values, increase and decrease ratios, etc., according to item identifiers.

The forecast information DB of FIGS. 2 to 7 is illustrated as an example to aid in understanding the present invention, and those of ordinary skill in the art will understand that the present invention is not limited to the structure.

Figure 8:
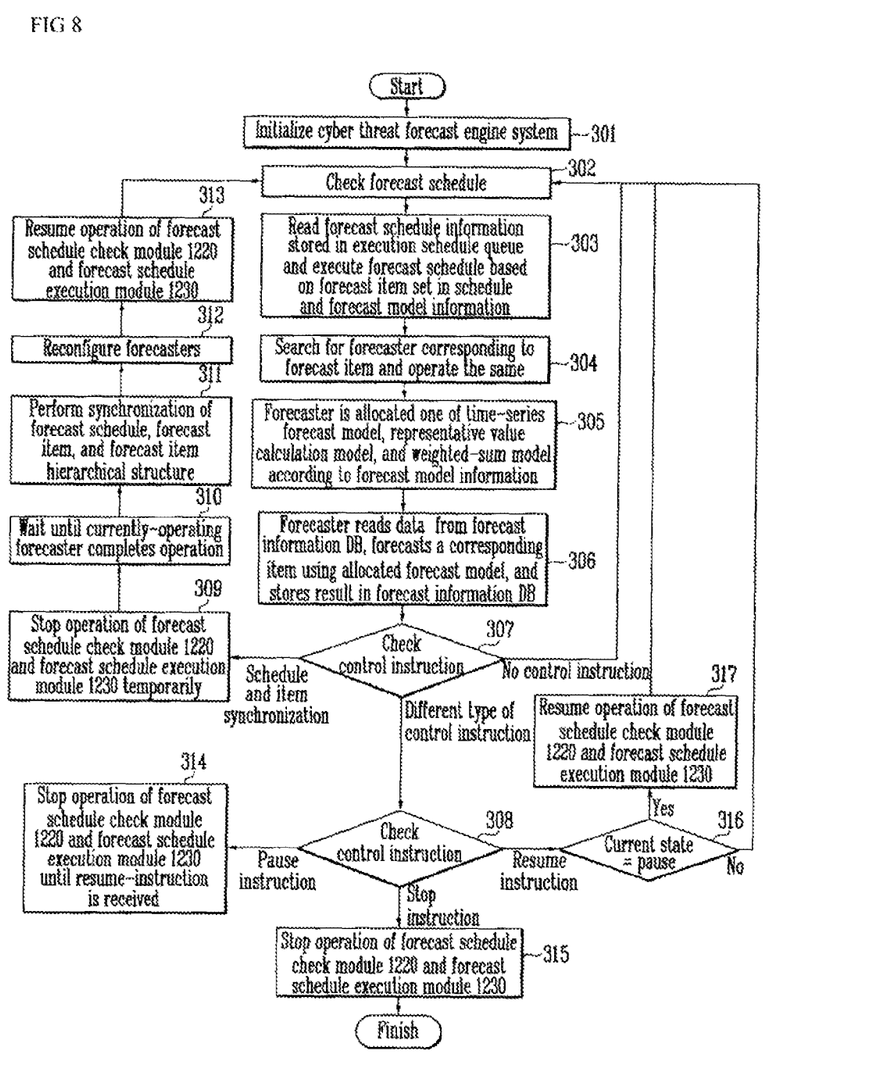
FIG. 8 is a flowchart illustrating a method of forecasting a cyber threat in a cyber threat forecast engine system according to an exemplary embodiment of the present invention.

FIG. 8 is a flowchart illustrating a method of forecasting a cyber threat in a cyber threat forecast engine system according to an exemplary embodiment of the present invention.

As illustrated in FIG. 8, in step 301, the cyber threat forecast engine system 1000 is initialized. Configuration information needed for system execution is read from a configuration file, and a log generated during system execution begins to be recorded. The forecast schedule management module 1210 reads forecast schedule information included in forecast item information from the forecast information DB 1400 and stores it in a memory. The forecast item hierarchical structure management module 1240 reads forecast item hierarchical structure information from the forecast information DB 1400 and constructs an entire forecast item hierarchical structure. The hierarchical forecaster management module 1250 configures forecasters corresponding to forecast items of the entire forecast item hierarchical structure one to one, thereby completing system initialization.

In step 302, the forecast schedule check module 1220 periodically checks a standby forecast schedule. When it is a set forecast time, the forecast schedule check module 1220 converts the standby forecast schedule into an execution schedule by removing the standby schedule from a standby schedule list managed by the forecast schedule management module 1210 and inserting the removed schedule into an execution schedule queue.

In step 303, the forecast schedule execution module 1230 sequentially reads forecast schedule information stored in the execution schedule queue and transfers a forecast item corresponding to the schedule to the hierarchical forecaster management module 1250, thereby executing the forecast schedule.

In FIG. 8, steps 302 and 303 are illustrated in sequence, but those of ordinary skill in the art will understand that the forecast schedule check module 1220 and the forecast schedule execution module 1230 can be generated in different threads and separately operated.

In step 304, the hierarchical forecaster management module 1250 searches for a forecaster corresponding to a forecast item received from the forecast schedule execution module 1230, provides forecast model information related to the forecast item to the searched forecaster, and generates and operates the forecaster in a thread.

In step 305, the forecaster is allocated a time-series forecast model object (e.g., the ARIMA model, Holt-Winter's model, etc.), a representative value calculation model object, or a weighted-sum model object from the forecast model allocation module 1260 according to the received forecast model information.

In step 306, the forecaster reads data (e.g., cyber threat time-series data, and cyber threat sample data such as an expert's opinion) from the forecast information DB 1400 through the forecast engine DB management sub-system 1300I; forecasts a corresponding cyber-threat using the allocated forecast model object, and then stores the forecast result in the forecast information DB 1400.

When a time-series forecast model object (such as the ARIMA model, Holt-Winter's model, etc.) is allocated, the forecaster reads cyber threat time-series data from the forecast information DB 1400 and forecasts a corresponding cyber-threat. When the representative value (a mean, etc.) calculation model object is allocated, the forecaster reads cyber threat sample data from the forecast information DB 1400 and forecasts a corresponding cyber-threat. When the weighted-sum model object that sums forecast results on lower-level cyber threat items in consideration of weights to forecast an upper-level item (cyber-threat) is allocated, the forecaster reads forecast results on lower-level items and weight information from the forecast information DB 1400 and forecasts a corresponding cyber-threat. At this time, when there are no forecast results on the lower-level items, a recursive forecast process is performed by first executing forecasters corresponding to the lower-level items and then executing a next-upper level forecaster. The detailed structure and operation of the forecaster will be described later with reference to FIGS. 9 and 10.

In step 307, a control instruction received through the forecast engine control interface 1100 is checked. When there is no control instruction, the process proceeds to step 302 to check the forecast schedule.

On the other hand, when the control instruction is schedule and item synchronization, operation of the forecast schedule check module 1220 and the forecast schedule execution module 1230 is stopped temporarily (S309), and the forecast schedule check module 1220 and the forecast schedule execution module 1230 wait until the currently-operating forecaster completes its operation (S310). After all the currently-operating forecasters complete their operations, modified forecast item information and forecast item hierarchical information is read from the forecast information DB 1400, and the forecast schedule and forecast item hierarchical structure are synchronized (S311), and forecasters are reconfigured according to the synchronized forecast item hierarchical structure (S312). Subsequently, operation of the forecast schedule check module 1220 and the forecast schedule execution module 1230 that are stopped temporarily is resumed (S313), and then the process proceeds to step 302 to check a standby forecast schedule.

When it is determined in step 308 that the control instruction is a resume instruction, it is determined whether a current state is a pause state (S316). When the current state is the pause state, operation of the forecast schedule check module 1220 and the forecast schedule execution module 1230 is resumed (S317), and then the process proceeds to a forecast schedule check step (S320). When the current state is not the pause state, the process proceeds to the forecast schedule check step (S320).

When it is determined in step 308 that the control instruction is a stop instruction, operation of the forecast schedule check module 1220 and the forecast schedule execution module 1230 is stopped (S315). At this time, when the execution schedule remains, it is no longer executed, and forecasters that are currently operating in different threads are first stopped by the hierarchical forecaster management module 1250.

Figure 9:
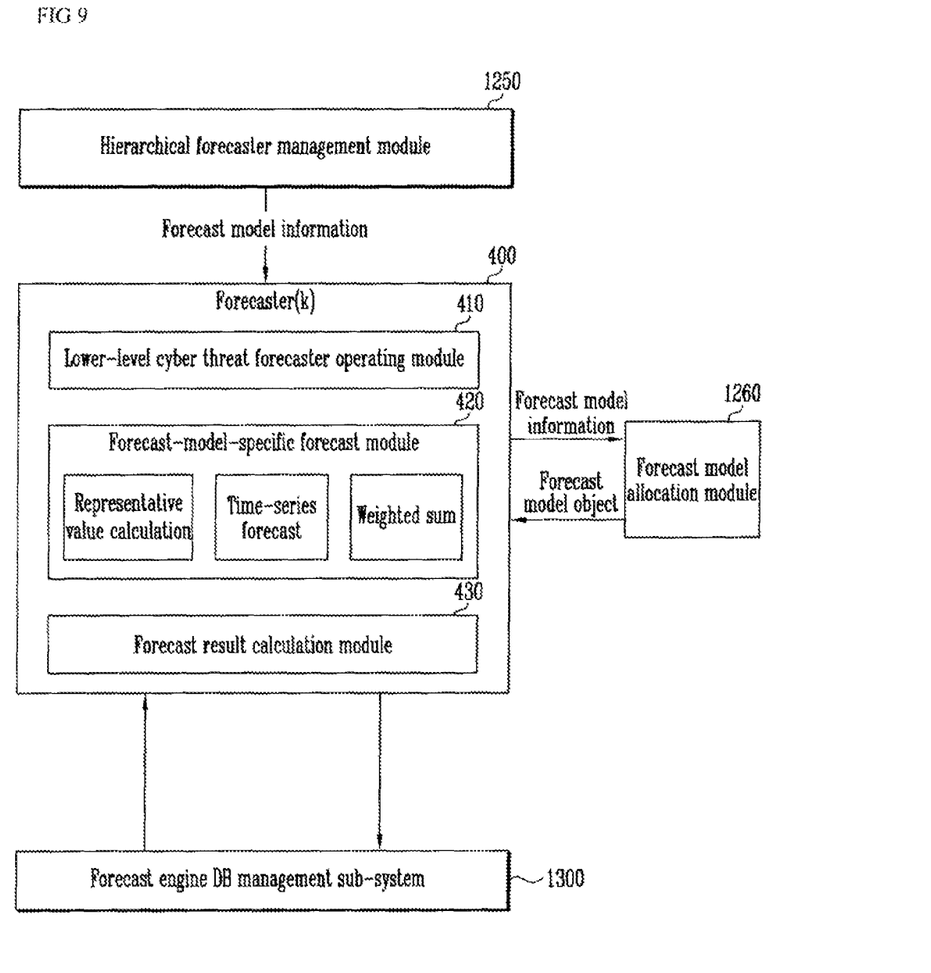
FIG. 9 is a block diagram of a forecaster according to an exemplary embodiment of the present invention.

FIG. 9 is a block diagram of a forecaster according to an exemplary embodiment of the present invention. As shown in the drawing, a forecaster 400 includes a lower-level cyber threat forecaster operating module 410, a forecast-model-specific forecast module 420, and a forecast result calculation module 430. Assuming that the forecaster 400 is in a level k of a hierarchical structure, the lower-level cyber threat forecaster operating module 410 first operates forecasters in a lower level than the level k based on depth-first-search. The lower-level forecasters are recursively executed.

The forecast-model-specific forecast module 420 reads related cyber threat data from the forecast information DB 1400 and forecasts a corresponding cyber threat using a forecast model object allocated by the forecast model allocation module 1260. In an exemplary embodiment, the allocated forecast model object is one of the representative value calculation model, the time-series forecast model, and the weighted-sum model. The forecast-model-specific forecast module 420 forecasts the corresponding cyber threat based on representative value calculation, time-series forecast, and weighted-sum using the associated forecast model objects.

The forecast result calculation module 430 calculates at least one of an accuracy, the highest value, the lowest value, an increase and decrease ratio, and an error based on a forecast value of the forecast-model-specific forecast module 420, transfers a forecast result including the calculated value, a measured value, and the forecast value to the DB management sub-system 1300, and instructs the DB management sub-system 1300 to store the forecast result in the forecast information DB 1400.

Figure 10:
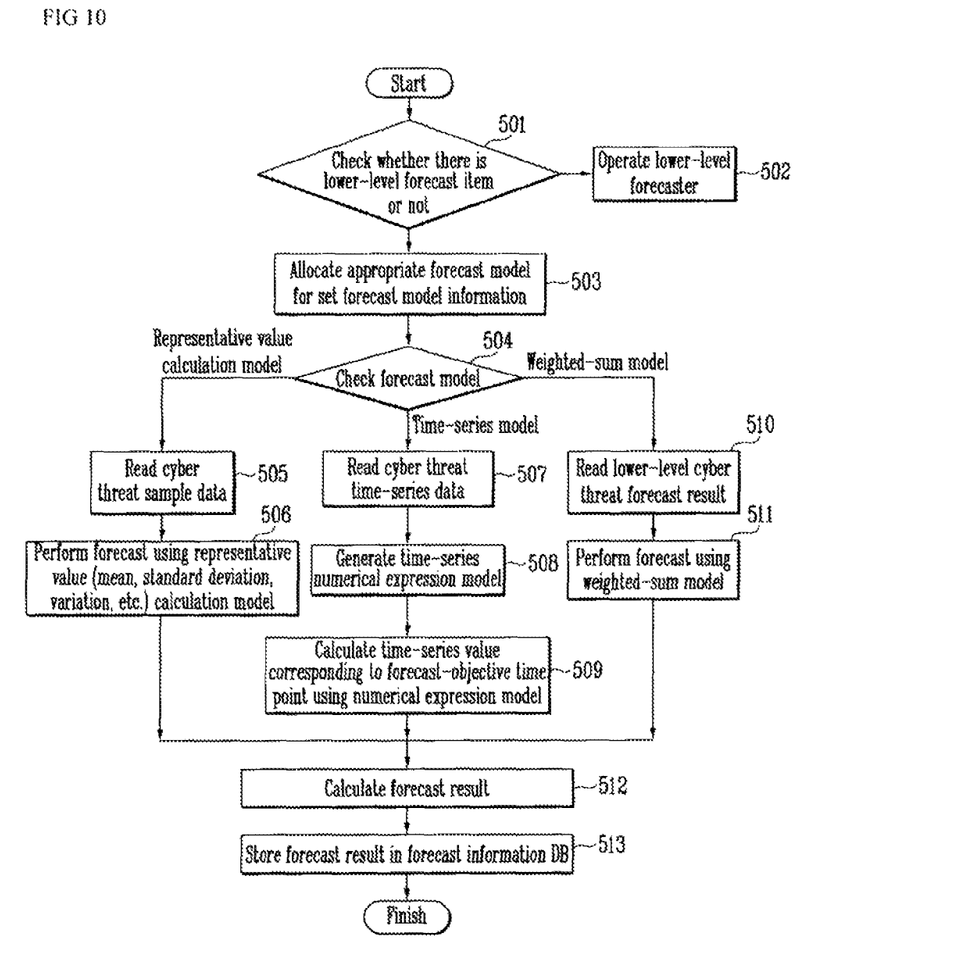
FIG. 10 is a flowchart illustrating operation of a forecaster related to a cyber threat according to an exemplary embodiment of the present invention.

FIG. 10 is a flowchart illustrating operation of a forecaster related to a cyber threat according to an exemplary embodiment of the present invention.

First, assuming that the forecaster corresponds to a (cyber threat) forecast item in a level k of a cyber threat hierarchical structure, it is determined whether there is a forecaster corresponding to a forecast item in a lower level than the level k (S501). When there is a lower-level forecaster, it is first executed (S502). In other words, before a forecaster (e.g., a forecaster for the overall degree of cyber threats) in an upper level of the hierarchical structure is operated, lower-level forecasters are searched for based on depth-first-search and recursively executed.

In step 503, the forecaster is allocated a forecast model object by the forecast model allocation module 1260 based on forecast model information received from the hierarchical forecaster management module 1250.

In step 504, the forecaster checks the forecast model object. In an exemplary embodiment, the forecast model object is one of the representative value calculation model, the time-series forecast model, and the weighted-sum model. The representative value calculation model reads sample group data corresponding to a forecast time point and calculates statistical representative values such as a median, quartile, mean, maximum, minimum, and mode. The time-series forecast model is a numerical expression model expressing a future forecast value using a function of a past time-series value on the assumption that the pattern of time-series data obtained in the past is also applied to the future. The weighted-sum model calculates the degree of threat in consideration of input values and the degree of importance of each input value. Here, weights are given to the forecasted values for the lower-level threat items, and the weighted values are summed, thereby calculating a forecast value for an upper-level cyber threat forecast item.

When the representative value calculation model is allocated to the forecaster, sample group data corresponding to a forecast time point is read from the forecast information DB 1400 (S505), and statistical representative values, such as a median, quartile, mean, maximum, minimum, and mode, are calculated (S506). For example, when a mean is used as a statistical representative value, a forecast value for a forecast item k at a time point $t+\Delta t$ forecasted at the time t, $\widehat{T_{(k,t+\Delta t)}}$, is calculated by the following equation:

$$\widehat{T_{(k,t+\Delta t)}} = \frac{\sum_{v \in S_{(k,t+\Delta t)}} v}{|S_{(k,t+\Delta t)}|} \quad \text{[Equation 1]}$$

Here, $S_{(k,t+\Delta t)}$ denotes a sample set of values that the forecast item k has at a time point $t+\Delta t$. For example, a cyber threat forecast item such as the degree of importance of a main event schedule or opinion about cyber threats may use the representative value calculation model. For example, in the case of the degree of importance of a main event schedule, the degree of threat corresponding to March 2 forecasted on March 1 is the mean of the degrees of importance of main events registered on March 2. Also, in the case of opinion about cyber threats, the degree of threat corresponding to March 2 forecasted on March 1 is the mean of the degrees of threat forecasted by respective experts on March 2.

Meanwhile, when the time-series forecast model is allocated to the forecaster, time-series data related to the corresponding cyber threat is read from the forecast information DB 1400 (S507), an appropriate numerical expression model for a series of numbers is generated by analyzing the time-series data (S508), and a time-series value corresponding to a time point for which a forecast is performed (i.e., a forecast-objective time point) is calculated using the generated numerical expression model (S509). To analyze the time-series data and generate the appropriate numerical expression for a series of numbers, least square error estimation, in which a parameter is estimated to minimize an error between measurement data and data generated using a time-series forecast model set by a user, or maximum likelihood estimation may be used.

For example, when the forecast item k in the lowermost level of the hierarchical structure of the forecaster conforms to ARMA(1,1) model, a forecast value for a forecast item k at a time point $t+\Delta t$ forecasted at the time t, $\widehat{T_{(k,t+\Delta t)}}$, is calculated by the following equation:

$$\widehat{T_{(k,t+\Delta t)}} = \phi_1 \widehat{T_{(k,t+\Delta t-1)}} + \alpha_{t+\Delta t} - \theta_1 \alpha_{t+\Delta t-1} \quad \text{[Equation 2]}$$

Here, $a_t$ denotes white noise whose average is 0 and variance is $\sigma^2$, and $\phi_1$ and $\theta_1$ denote parameters of a time-series term $\widehat{T_{(k,t+\Delta t-1)}}$ and a white noise term $(a_{t+\Delta t-1})$ at a time point $(t+\Delta t-1)$ that is a forecast time point $(t+\Delta t)-1$, respectively (here, $|\phi_1|, |\theta_1|<1$). As mentioned above, $\phi_1$ and $\theta_1$ may be estimated using least square error estimation, in which an error between measured time-series data and a forecast value is minimized, or maximum likelihood estimation. Also, a past time-series term $\widehat{T_{(k,t+\Delta t-1)}}$ may be recursively calculated as $\widehat{T_{(k,t+\Delta t-1)}} = \phi_1 \widehat{T_{(k,t+\Delta t-2)}} + \alpha_{t+\Delta t-1} - \theta_1 \alpha_{t+\Delta t-2}$. In an exemplary embodiment, the frequency of intrusion detection events and the frequency of hacking may be forecasted based on the time-series model.

Meanwhile, when the weighted-sum model is allocated to the forecaster, the forecasted threat degrees of lower-level cyber threat items are read from the forecast information DB 1400 (S510). The forecast values are normalized, weights are given to the normalized values, and the weighted values are summed to calculate a forecast value for an upper-level cyber threat item (S511). A forecast value for a forecast item k at a time point $t+\Delta t$ forecasted at the time t based on the weighted-sum model, $\widehat{T_{(k,t+\Delta t)}}$ is calculated by the following equation:

$$\widehat{T_{(k,t+\Delta t)}} = \sum_{i \in \{lower\ lever\ forecast\ items\ of\ k\}} w_{(k,i)} n_i (\widehat{T_{(i,t+\Delta t)}}) \quad \text{[Equation 3]}$$

Here, $w_{(k,i)}$ denotes the weight of a lower-level item i with respect to the upper-level item k. $\widehat{T_{i,t+\Delta t}}$ denotes a forecast value for a forecast item i at a time point $t+\Delta t$ forecasted at the time t. Since the range of the forecast value varies according to threat items, it needs to be normalized between 0 and 100. $n_i(x)$ is a function of normalizing x input within a range of the forecast value for the forecast item i can have between 0 and 100. In the normalization, the position of x, which will be normalized, in a standard normal distribution is calculated and converted into a percentage on the assumption that the past values of the forecast item i follow a normal distribution. Alternatively, assuming that the minimum degree of threat and the maximum degree of threat for a predetermined time period from a specific time point in the past to the present time are 0 and 100, the position of x, which will be normalized, may be converted into a value between 0 and 100. In an exemplary embodiment, the overall degree of threat from cyber threats, the degree of threat from malicious code, the degree of threat from vulnerabilities, or the degree of threat from cyber demonstrations among the cyber threat forecast items may be forecasted using the weighted-sum model.

In step 512, at least one of the highest forecast value, the lowest forecast value, a forecasted increase and decrease ratio, a forecast error, and a forecast accuracy is calculated based on the forecast values calculated using the time-series forecast model, the representative calculation model, and the weighted-sum model. The forecast accuracy is a mean accuracy obtained by inverting an error ratio of a forecast value to a measured value for past n days. An accuracy $A_{(k,t)}$ of the forecast item k at a time point t is expressed by the following equation:

$$A_{(k,t)} = 1 - \frac{1}{n} \sum_{i=t-n}^{t-1} \min\left(1, \frac{|T_{(k,i)} - \widehat{T_{(k,i)}}|}{T_{(k,i)}}\right) \quad \text{[Equation 4]}$$

Here, $T_{(k,i)}$ denotes a value of a forecast item k measured at a time point i, and $\widehat{T_{(k,i)}}$ denotes a value of the forecast item k forecasted at the time point i.

A forecast result including the forecast value and the values calculated in step 512 is stored in the forecast information DB 1400 (S513), thereby completing operation of the forecaster.

The weighted-sum model, the time-series model, and the representative value calculation model are used as a forecast model in the above-described exemplary embodiment of the present invention, but an appropriate model for the characteristics of cyber threats can be added to the above-described cyber threat forecast engine framework and used. Also, the time-series model is not limited to the ARIMA model, Holt-Winter's model, a generalized autoregressive conditional heteroskedasticity (GARCH) model, etc., but an appropriate time-series model may be selected and used according to cyber threat time-series data. Furthermore, a parameter estimation method of a time-series forecast model, the type of a representative value used in the representative value calculation model, a normalization method or threat-specific weights used in the weighted-sum model may be dynamically set by a user through the forecast information DB management sub-system 1300 without affecting operation of the forecast engine core sub-system 1200.

Figure 11:
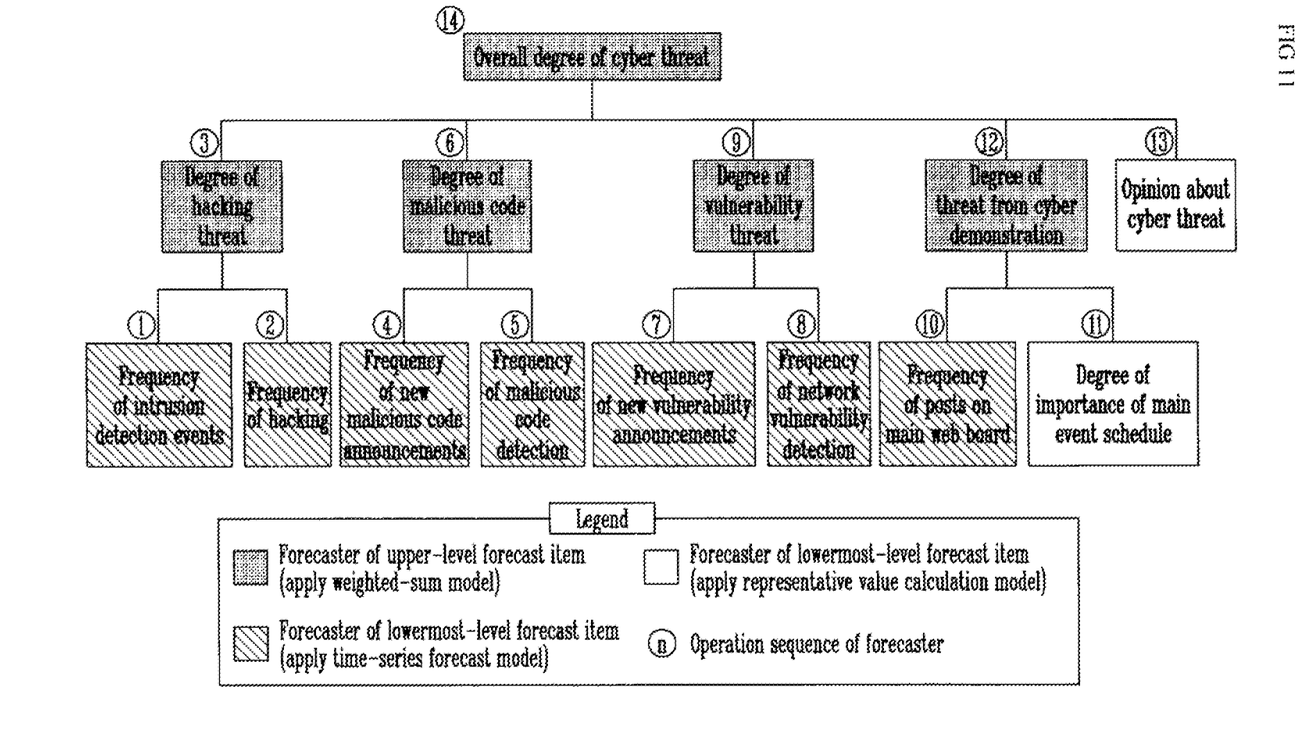
FIG. 11 illustrates an operation sequence of forecasters in a cyber threat forecasting process having a hierarchical structure according to an exemplary embodiment of the present invention.

FIG. 11 illustrates an operation sequence of forecasters in a cyber threat forecasting process having a hierarchical structure according to an exemplary embodiment of the present invention.

As shown in FIG. 11, the hierarchical structure of forecasters is maintained in a tree form. Before a forecaster (a forecaster for overall degree of cyber threats) positioned in the uppermost level of the hierarchical structure is operated, all lower-level forecasters are operated using depth-first-search among tree search methods. When the lower-level forecasters are operated, forecast results are recursively calculated using the time-series forecast model, the representative value calculation model, or the weighted-sum model set by a user according to lower-level forecast items. Finally, the uppermost-level forecaster gives weights to the recursively calculated lower-level forecast results according to the lower-level forecast items and produces a final forecast result.

Specifically, forecasters positioned in the lowermost level of the tree structure, that is, the hierarchical structure of the forecasters perform a forecast using the time-series model or the representative value calculation model. Forecasters positioned at internal nodes of the tree structure forecasts a corresponding item based on the weighted-sum model using the forecast results of the lowermost-level forecasters. For example, in FIG. 10, a forecaster for forecasting the degree of hacking threat is set to be operated after lower-level forecasters for forecasting the frequency of intrusion detection events and the frequency of hacking are operated first.

Various embodiments may be implemented using hardware elements, software elements, or a combination of both. Examples of hardware elements may include any of the examples as previously provided for a logic device, and further including microprocessors, circuits, integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A cyber threat forecast engine system comprising:
a memory;
a forecast information database (DB) configured to store forecast information including a plurality of cyber threat forecast items with a forecast item hierarchical structure, a forecast schedule and forecast model information related to each of the cyber threat forecast items, hierarchical structure information between the cyber threat forecast items, cyber threat time-series data, and cyber threat sample data;
a forecast engine core sub-system configured to forecast degrees of threat for the cyber threat forecast items with the forecast item hierarchical structure using the forecast information stored in the forecast information DB; and
a forecast engine control interface configured to receive a control instruction for the forecast engine core sub-system from a user or external system and transfer the control instruction to the forecast engine core sub-system,
wherein the cyber threat forecast items with the forecast item hierarchical structure comprise cyber threat forecast items belonging to a lower level of the forecast item hierarchical structure and cyber threat forecast items belonging to an upper level of the forecast item hierarchical structure, and
wherein the forecast engine core sub-system is configured to calculate a forecast value of a degree of threat with respect to each of the cyber threat forecast items belonging to the lower level of the forecast item hierarchical structure, and further calculate a forecast value of a degree of threat with respect to each of the cyber threat forecast items belonging to the upper level of the forecast item hierarchical structure by giving weights to the forecast value of each of the cyber threat forecast items belonging to the lower level of the forecast item hierarchical structure and adding up the weighted results.

2. The cyber threat forecast engine system of claim 1, further comprising:
a forecast information DB management sub-system configured to request the forecast information from the forecast information DB and storing the forecast results of the forecast engine core sub-system in the forecast information DB.

3. The cyber threat forecast engine system of claim 1, wherein the forecast engine control interface and the forecast engine core sub-system are separately executed in different threads.

4. The cyber threat forecast engine system of claim 1, wherein the control instruction received by the forecast engine control interface includes at least one of start, stop, pause and resume of the forecast engine core sub-system, and synchronization of the forecast items and the forecast item hierarchical structure information with the forecast information DB.

5. The cyber threat forecast engine system of claim 1, wherein the forecast engine core sub-system includes:
a forecast schedule management module for reading the forecast schedule from the forecast information DB, storing the forecast schedule in a memory, and managing a standby schedule for to-be forecasted cyber threat forecast items and an execution schedule for currently-forecasted cyber threat forecast items;
a forecast item hierarchical structure management module for reading the forecast item hierarchical structure information from the forecast information DB, constructing an entire forecast item hierarchical structure, and storing the entire forecast item hierarchical structure in a memory;
a hierarchical forecaster management module for configuring and managing forecasters respectively corresponding to the forecast items according to the entire forecast item hierarchical structure; and
a forecast schedule execution module for reading the execution schedule managed by the forecast schedule management module and transferring a forecast item and
forecast model information related to the execution schedule to the forecaster management module,
wherein the forecaster management module searches for a forecaster corresponding to the forecast item transferred from the forecast schedule execution module and operates the forecaster, and the forecaster performs a forecast according to the forecast model information related to the forecast item.

6. The cyber threat forecast engine system of claim 5, further comprising:
a forecast schedule check module for periodically checking a forecast time point set in the standby schedule, and when it is the set time point, converting the standby schedule into an execution schedule,
wherein the forecast schedule check module is executed in a different thread from the forecast schedule execution module.

7. The cyber threat forecast engine system of claim 5, wherein the forecast schedule management module manages the standby schedule using a double-linked list structure and the execution schedule using a queue structure.

8. The cyber threat forecast engine system of claim 5, wherein the hierarchical forecaster management module includes:
a forecaster configuration module for configuring the forecasters corresponding to the forecast items based on the entire forecast item hierarchical structure;
a forecaster search module for searching for the forecaster corresponding to the forecast item received from the forecast schedule execution module;
a forecaster operating module for operating the searched forecaster; and
a forecaster control module for performing at least one of stop, pause and resume of the forecaster.

9. The cyber threat forecast engine system of claim 5, further comprising:
a forecast model allocation module for allocating one of a time-series forecast model object, a representative value calculation model object, and a weighted-sum model object to the forecaster according to the forecast model information related to the forecast item.

10. The cyber threat forecast engine system of claim 1, further comprising:
a configuration and log management module configured to record configuration information and an execution log of the forecast engine core sub-system.

11. The cyber threat forecast engine system of claim 10, wherein the configuration information includes at least one of whether the forecasters operate in multiple threads or a single thread, a maximum number of multiple threads, a degree of detail of the execution log, and a forecast schedule check cycle.

12. The cyber threat forecast engine system of claim 9, wherein when the forecast item corresponding to the forecaster is positioned in the lowermost level of the entire forecast item hierarchical structure, the forecaster reads the cyber threat time-series data or the cyber threat sample data from the forecast information DB and forecasts the corresponding forecast item based on the forecast model object allocated by the forecast model allocation module.

13. The cyber threat forecast engine system of claim 9, wherein when the forecast item corresponding to the forecaster is positioned in an upper level of the entire forecast item hierarchical structure, the forecaster recursively operates forecasters corresponding to forecast items positioned in a lower level, and then forecasts the corresponding forecast item using the forecast results on the lower-level forecast items and the weighted-sum forecast model.

14. A method of forecasting a cyber threat in a cyber threat forecast engine system having a forecast information database (DB) storing forecast information including a plurality of cyber threat forecast items with a forecast item hierarchical structure, a forecast schedule and forecast model information related to the cyber threat forecast items, forecast item hierarchical structure information, cyber threat time-series data, and cyber threat sample data, the method comprising:

reading the cyber threat forecast items, the forecast schedule, the forecast model information, and the forecast item hierarchical structure information from the forecast information DB, storing the read information in a memory, and configuring forecasters based on the forecast item hierarchical structure information to initialize the system;

periodically checking the forecast schedule stored in the memory and determining whether or not it is a forecast time point;

when it is the forecast time point according to the forecast schedule, searching for a forecaster corresponding to a forecast item related to the forecast schedule and providing forecast model information related to the forecast item to the searched forecaster;

reading, at the forecaster, at least one of the forecast information from the forecast information DB and forecasting a corresponding forecast item based on the provided forecast model information; and storing a forecast result including a forecast value calculated by the forecaster in the forecast information DB, wherein the cyber threat forecast items with the forecast item hierarchical structure comprise cyber threat forecast items belonging to a lower level of the forecast item hierarchical structure and cyber threat forecast items belonging to an upper level of the forecast item hierarchical structure, and wherein a forecast value of a degree of threat with respect to each of the cyber threat forecast items belonging to the lower level of the forecast item hierarchical structure is calculated, and a forecast value of a degree of threat with respect to each of the cyber threat forecast items belonging to the upper level of the forecast item hierarchical structure is further calculated by giving weights to the forecast value of each of the cyber threat forecast items belonging to the lower level of the forecast item hierarchical structure and adding u the weighted results.

15. The method of claim 14, further comprising:

allocating one of a time-series forecast model object, a representative value calculation model object, and a weighted-sum model object to the forecaster based on the provided forecast model information.

16. The method of claim 15, wherein when the forecast item corresponding to the forecaster is positioned in the lowermost level of the forecast item hierarchical structure, the forecaster reads at least one of the cyber threat time-series data or the cyber threat sample data from the forecast information DB and forecasts the corresponding forecast item based on the forecast model object.

17. The method of claim 15, wherein when the forecast item corresponding to the forecaster is positioned in an upper level of the forecast item hierarchical structure, the forecaster recursively operates forecasters corresponding to forecast items positioned in its lower level, and then forecasts the corresponding forecast item using the forecast results on the lower-level forecast items and the weighted-sum forecast model.

* * * * *